(12) United States Patent
Burke et al.

(10) Patent No.: US 8,579,136 B2
(45) Date of Patent: *Nov. 12, 2013

(54) LIMITED FLOW CUP

(75) Inventors: Andrea Burke, Hudson, MA (US);
Richard M. Davis, Guntersville, AL (US); Gerald Melsky, Newtown, MA (US); David Porat, Newton, MA (US); Jerry Porter, Kensington, MD (US)

(73) Assignee: Reliant Medical Products, Inc., Birmingham, AL (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/962,865

(22) Filed: Dec. 8, 2010

(65) Prior Publication Data

US 2011/0168703 A1   Jul. 14, 2011

Related U.S. Application Data

(63) Continuation of application No. 10/851,694, filed on May 21, 2004, now Pat. No. 7,854,342, and a continuation of application No. 10/174,195, filed on Jun. 17, 2002, now Pat. No. 6,755,318, and a continuation-in-part of application No. 09/711,796, filed on Nov. 13, 2000, now abandoned.

(51) Int. Cl.
*B65D 21/02* (2006.01)

(52) U.S. Cl.
USPC ............... 220/23.88; 220/23.87; 220/703; 222/436; 222/456

(58) Field of Classification Search
USPC ........ 220/703, 23.88, 710.5, 711, 718, 23.87; 222/436, 441, 456
See application file for complete search history.

(56) References Cited

U.S. PATENT DOCUMENTS

| | | | |
|---|---|---|---|
| 699,621 A | | 5/1902 | Humphreys |
| 1,498,491 A | | 6/1924 | Stinson et al. |
| 1,617,213 A | * | 2/1927 | La Paugh ............... 215/11.6 |
| 2,148,421 A | | 2/1939 | Allan |
| 2,218,681 A | | 10/1940 | Laux |
| 2,233,996 A | | 3/1941 | Dent |
| 2,460,542 A | | 2/1949 | Smith |
| 2,534,614 A | * | 12/1950 | Michael ............... 220/713 |
| 2,693,301 A | | 11/1954 | Allen, Jr. |
| 3,107,031 A | | 10/1963 | Adams |
| 4,146,157 A | | 3/1979 | Dixon, Sr. et al. |
| 4,214,679 A | | 7/1980 | Whang |
| 4,424,921 A | | 1/1984 | Feuerstein et al. |

(Continued)

FOREIGN PATENT DOCUMENTS

| | | |
|---|---|---|
| FR | 460765 | 10/1913 |
| FR | 753767 | 10/1933 |

(Continued)

OTHER PUBLICATIONS

Canadian Office Action in Canadian Application No. 2,428,592, dated Oct. 3, 2008, 4 pages.

(Continued)

*Primary Examiner* — Anthony Stashick
*Assistant Examiner* — Christopher McKinley
(74) *Attorney, Agent, or Firm* — Fish & Richardson P.C.

(57) ABSTRACT

Limited flow cups are provided which deliver a metered amount of fluid to a user during a drinking motion.

20 Claims, 17 Drawing Sheets

(56) References Cited

U.S. PATENT DOCUMENTS

| | | | |
|---|---|---|---|
| 4,437,576 A | 3/1984 | Barniak | |
| 4,442,948 A | 4/1984 | Levy et al. | |
| 4,589,569 A | 5/1986 | Clements | |
| 4,643,326 A | 2/1987 | Klingler | |
| 4,684,045 A | 8/1987 | Su | |
| 4,714,174 A | 12/1987 | Williams | |
| 4,828,149 A | 5/1989 | Hester | |
| 4,918,499 A | 4/1990 | Matsutani et al. | |
| 4,921,112 A * | 5/1990 | Juhlin et al. | 215/11.4 |
| 4,948,499 A | 8/1990 | Peranio | |
| 4,966,300 A | 10/1990 | Coonradt | |
| 5,222,940 A | 6/1993 | Wilk | |
| 5,294,018 A | 3/1994 | Boucher | |
| 5,323,928 A | 6/1994 | Stevens | |
| 5,405,055 A | 4/1995 | Hester | |
| 5,431,297 A | 7/1995 | Rosello | |
| 5,477,895 A | 12/1995 | Willard | |
| 5,632,407 A | 5/1997 | Christensen | |
| 5,810,210 A | 9/1998 | Kelley et al. | |
| 5,839,599 A | 11/1998 | Lin | |
| 6,161,720 A | 12/2000 | Castle | |
| 6,264,058 B1 | 7/2001 | Porter et al. | |
| 6,471,085 B1 | 10/2002 | Gallo | |
| 7,854,342 B2 * | 12/2010 | Burke et al. | 220/23.88 |

FOREIGN PATENT DOCUMENTS

| | | |
|---|---|---|
| FR | 760765 | 3/1934 |
| GB | 27439 | 0/1910 |
| GB | 241074 | 10/1925 |
| IT | 597059 | 8/1959 |
| WO | WO 02/38012 | 5/2002 |

OTHER PUBLICATIONS

Canadian Office Action in Canadian Application No. 2,428,592, dated Sep. 16, 2009, 4 pages.
Canadian Office Action in Canadian Application No. 2,489,400, dated Dec. 3, 2009, 2 pages.
Canadian Office Action in Canadian Application No. 2,489,400, dated Oct. 27, 2010, 3 pages.
European Office Action in European Application No. 02 778 546.8, dated Nov. 24, 2005, 3 pages.
European Office Action in European Application No. 02 778 546.8, dated Apr. 7, 2006, 2 pages.
European Office Action in European Application No. 01 985 645.9, dated Dec. 5, 2005, 3 pages.
European Office Action in European Application No. 01 985 645.9, dated May 2, 2006, 3 pages.
European Office Action in European Application No. 01 985 645.9, dated Jan. 11, 2007, 2 pages.
Authorized Officer M. Joe. International Search Report in International Application No. PCT/US2001/51171, dated May 29, 2002, 2 pages.
Authorized Officer O. Reichhardt. European Search Report in International Application No. PCT/US2002/32785, dated Sep. 13, 2005, 3 pages.

* cited by examiner

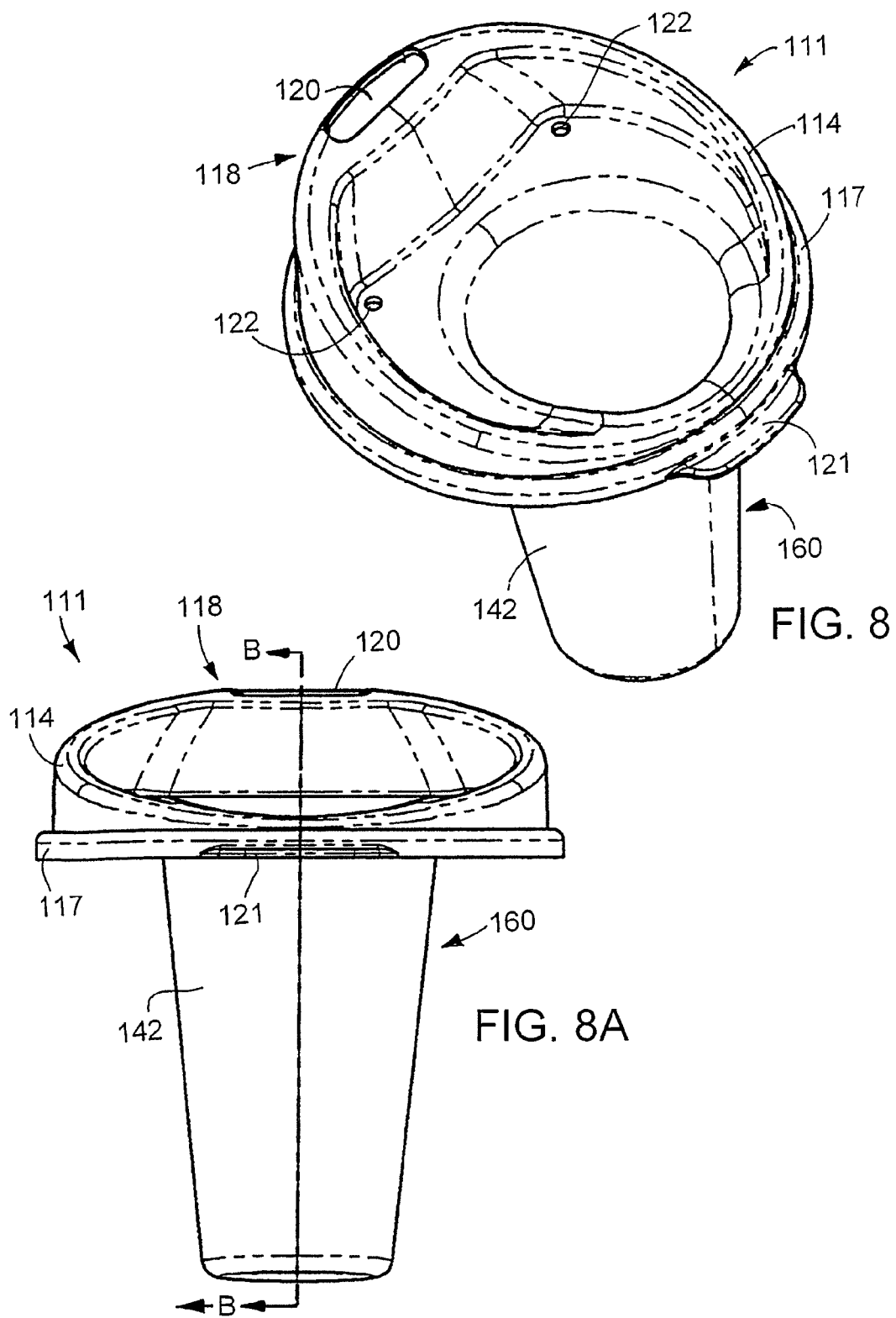

LIMITED FLOW CUP

CROSS-REFERENCE TO RELATED APPLICATIONS

This application is a continuation of and claims priority under 35 U.S.C. §120 to U.S. patent application Ser. No. 10/851,694, filed on May 21, 2004, which is a continuation of Ser. No. 10/174,195, filed on Jun. 17, 2002, which is a continuation-in-part of 09/711,796, filed on Nov. 13, 2000, the entire contents of which are incorporated herein by reference.

TECHNICAL FIELD

This invention relates to limited flow cups.

BACKGROUND

Dysphagia, a condition characterized by difficulty in swallowing food and liquids, can be present in patients suffering from stroke, head injury, neurological disorders, and other cognitive and motor problems. It may also occur as a result of aging, disability, or as a transient condition following some surgeries. As a result of dysphagia, patients may also suffer from dehydration and nutritional deficits.

When a person suffering from dysphagia attempts to swallow thin liquids, the bolus may tend to go down the bronchus and into the lungs, causing coughing, choking and even aspiration, which can lead to pneumonia. In order to maintain nutrition and hydration, these patients are sometimes given very small volumes, typically about one teaspoon. These smaller boluses can be more readily handled, often without aspiration problems.

Various devices, liquid thickeners and other products have previously been developed to assist patients with dysphagia, but these typically do not allow a fixed volume to be delivered, with a normal drinking motion, without the assistance of a caregiver.

Limited flow drinking cups are designed to provide a fixed, metered amount of liquid to a user. A typical limited flow cup includes a cup body having a cover that defines an opening through which fluid can pass. Metering is provided by a three-piece assembly including (a) the cover, (b) a tube that is fixed to the cover at the opening and extends downward into the cup body, and (c) a tiny, self-contained metering cup mounted at the lower end of the tube. The metering cup has an open end that faces in a generally sideways direction. Prior to drinking, the cup body contains liquid up to a given liquid level, the metering cup is full of liquid, and the tube is filled with liquid up to the liquid level within the cup body. The metering cup and the portion of the tube that is below the liquid level in the cup body together define a metering chamber having a limited volume. When the user tilts the limited flow cup to a drinking position, the liquid within the metering chamber flows through the tube and out through the opening to the user. When the cup body is in the drinking position, the open end of the metering cup generally extends above the liquid level within the cup body, so that fluid cannot flow into the metering cup. As a result, only the volume within the metering chamber is dispensed during a single drinking motion.

SUMMARY

The present invention features a limited flow cup that has a metering chamber that is defined by a nested relationship between a pair of cups. The nested arrangement allows the metering chamber to be defined by components that do not include any closed features, such as tubes, and provides a device that does not include any small or moving parts. The lack of closed features allows the cups to be readily molded. Ease of molding is further facilitated by the simple shape of the cups, which allows them to release relatively easily from a mold. As a result, the limited flow cup is generally economical to manufacture, e.g., by injection molding. The lack of small and moving parts allows the cup to be easily assembled both during manufacturing and prior to use by the user or a caregiver, and makes the cup relatively resistant to failure or damage. The cup is also easy for the user to correctly assemble and use. Additionally, the lack of closed features, which are typically difficult to clean, allows the limited flow cup to be kept clean and sanitary, e.g., by simply disassembling the nested cups and washing them in a dishwasher.

In one aspect, the invention features a limited flow cup, including a first cup, a second cup, in nested relationship with the first cup, and a fluid reservoir, the nested relationship of the first cup and second cup defining a metering chamber, in fluid communication with the reservoir, constructed to contain an amount of fluid for delivery to a user during a drinking motion, the metering chamber being configured to restrict the amount of fluid delivered to a user when the limited flow cup is tilted during the drinking motion.

Some implementations of this aspect of the invention may include one or more of the following features.

The metering chamber includes an inlet through which fluid can flow from the fluid reservoir to the metering chamber, the inlet being configured to allow entry of fluid from the reservoir into the metering chamber when the limited flow cup is in a first position, and restrict entry of fluid from the reservoir into the metering chamber when the limited flow cup is in a second, tilted position. The inlet is positioned so that it will be above the liquid level in the fluid reservoir when the limited flow cup is tilted during the drinking motion. The metering chamber includes a cavity and an elongated fluid passage in fluid communication with the cavity.

In some implementations, the first cup includes an outer cup, the second cup includes an inner cup, disposed within the outer cup, and the inner cup defines the fluid reservoir. The cavity is defined by an indentation in a lower surface of the inner cup, and a lower surface of the outer cup. The elongated fluid passage is defined by a channel extending into the inner cup, and a ridge protruding from an inner wall of the outer cup. The cavity includes an opening to allow fluid to flow into the cavity from the reservoir. The opening is in a side surface of the cavity, and the opening extends to a lower surface of the inner cup to allow for delivery of essentially all of the liquid in the reservoir. The limited flow cup further includes a cover that sealingly engages the rims of the inner and outer cups and defines an opening through which the user can drink the liquid. A lower surface of the cover defines an annular channel that, when the cover is in place, is in fluid communication with the metering chamber. The cover defines one or more apertures that communicate between the ambient air and the annular channel, allowing air to enter the annular channel. The cover further defines a drinking spout, and the aperture(s) allow sufficient air to enter the annular channel so that a user of the limited flow cup is hindered from withdrawing fluid from the limited flow cup by sucking on the drinking spout.

Alternatively, the limited flow cup further includes an outer cup that defines the fluid reservoir, and the first cup and second cup are disposed within the outer cup. The cavity is defined between bottom walls of the first and second cups, and the fluid passage is defined between side walls of the first and second cups. The first cup includes an opening to allow fluid to flow into the cavity from the reservoir. The opening is in a side surface of the first cup, and the opening extends up the side surface a sufficient distance to allow for delivery of essentially all of the liquid in the reservoir. The second cup includes a cover portion that defines an opening through which the user can drink the liquid. The first cup includes a rim portion that sealingly engages a peripheral edge of the cover portion. The rim portion also sealingly engages a rim of the second cup. The cover portion and an upper wall of the first cup together define an annular channel that, when the cover is in place, is in fluid communication with the metering chamber. The cover portion defines one or more apertures that communicate between the ambient air and the annular channel, allowing air to enter the annular channel. The cover portion further defines a drinking spout, and the aperture(s) allow sufficient air to enter the annular channel so that a user of the limited flow cup is hindered from withdrawing fluid from the limited flow cup by sucking on the drinking spout.

The limited flow cup further includes a pair of regions constructed to receive a corresponding pair of handles. The limited flow cup further includes a handle constructed to be received by the regions and thereby securely attached to the limited flow cup. The volume of the metering chamber is from about 4.5 to 5.5 ml. The volume of the cavity is from about 3 to 5 ml. The volume of the elongated fluid passage is less than about 25% of the total volume of the metering chamber. The volume of the metering chamber is less than 10% of the volume of the fluid reservoir. The amount of fluid delivered to the user when the fluid reservoir is 10% full varies by no more than 25% from the volume delivered when the fluid reservoir is 100% full. The cover defines a headspace volume that is from about 28% to 40% of the volume of the inner cup. The amount delivered to the user when the reservoir is 100% full will be less than or equal to the volume of the metering chamber. The amount delivered to the user immediately after the reservoir is initially filled by the user will be less than or equal to the volume of the metering chamber.

The outer cup and inner cup include corresponding structures to prevent the outer cup from being used without the inner cup in nested arrangement with the outer cup. The outer cup includes an aperture in a lower surface of the outer cup, through which liquid will flow if the outer cup is filled with liquid without the inner cup in nested arrangement with the outer cup. The inner cup includes a plug extending from its lower surface, the plug being positioned to seal the aperture in the lower surface of the outer cup when the inner and outer cups are properly nested. Alternatively, the aperture in the outer cup includes a raised rim, and the inner cup includes a recess that is constructed to seal around the raised rim and over the aperture when the inner and outer cups are properly nested.

In a further aspect, the invention features a limited flow cup, including (a) a first cup, (b) a second cup, in nested relationship with the first cup, (c) a fluid reservoir, the nested relationship of the first cup and second cup defining a metering chamber, in fluid communication with the reservoir, constructed to contain an amount of fluid for delivery to a user during a drinking motion, and (d) a cover, the cover including an aperture through which the liquid can be delivered to the user.

Some implementations include one or more of the following features. The cover is integral with one of the first and second cups. The cover includes a rim that sealingly engages a rim of one of the first and second cups to provide a fluidtight seal. The metering chamber includes an inlet through which fluid can flow from the fluid reservoir to the metering chamber, the inlet being positioned so that it will be above the liquid level in the fluid reservoir when the limited flow cup is tilted sufficiently to allow fluid to flow from the aperture.

In another aspect, the invention features a limited flow cup for dispensing a limited volume of liquid to a user each time the limited flow cup is tilted to a drinking position, the limited flow cup including: (a) an outer cup, (b) an inner cup, nested within the outer cup, for containing a supply of the liquid, and (c) a cover that is constructed to be sealingly applied to the outer cup and inner cup, the cover including an aperture through which the liquid can be delivered to the user. The outer cup and inner cup have adjacent spaced surfaces that together define a metering chamber that includes a cavity, and an elongated fluid passage in fluid communication between the cavity and the aperture. The cavity includes an inlet through which fluid can flow from the inner cup to the cavity, the inlet being positioned so that it will be above the liquid level in the inner cup when the inner cup is tilted sufficiently to allow fluid to flow from the aperture.

In another aspect, the invention features a limited flow cup for dispensing a limited volume of liquid to a user each time the limited flow cup is tilted to a drinking position, the limited flow cup including: (a) an outer cup for containing a supply of the liquid, (b) a middle cup, nested within the outer cup, and (c) an inner cup, nested within the middle cup, the inner cup including a cover portion that includes an aperture through which the liquid can be delivered to the user. The middle cup and inner cup have adjacent spaced surfaces that together define a metering chamber that includes a cavity, and an elongated fluid passage in fluid communication between the cavity and the aperture. The cavity includes an inlet through which fluid can flow from the outer cup to the cavity, the inlet being positioned so that it will be above the liquid level in the outer cup when the limited flow cup is tilted sufficiently to allow fluid to flow from the aperture.

In yet a further aspect, the invention features a limited flow cup including a pair of nesting inner and outer cups, the inner and outer cups being constructed to be nested and disassembled by a user, allowing easy cleaning, and the nested arrangement of the cups defining a fluid passage that does not exist when the cups are disassembled.

In some implementations, the inner and outer cups do not include any closed features.

Preferred limited flow cups of the invention include an "anti-suck" feature (e.g., the apertures in communication with the annular channel, described above) that impedes the user from circumventing the metering function by sucking fluid out of the cup. Thus, in such cups the metering feature generally cannot be circumvented by applying mouth suction to the hole in the lid of the cup through which the user drinks.

Some preferred cups do not require the person filling the cup with liquid to follow any special or non-obvious steps, such as filling the cup so that liquid stays below a fill line or mark on the cup, steps which may be difficult for caregivers to remember. Such preferred cups are also designed to meter fluid even when filled to the rim of the cup, while still maintaining an aesthetic cup shape, as will be discussed in detail below. The ability of the cup to function properly when filled to the rim ensures that a metered volume will be delivered each time the user drinks from the cup, including the first drink when the cup is at its fullest. This assurance of first-pour functioning is very important in dysphagia applications, due to the grave consequences that may result from receiving too large a volume of liquid even once.

In some implementations, the assembled cup is generally spill-proof, with only a single metered volume of liquid exiting the cup when it is inadvertently knocked on its side.

Other features and advantages of the invention will be apparent from the description and drawings, and from the claims.

DESCRIPTION OF DRAWINGS

In FIG. 2, the cup is in an upright position. In FIG. 2A the cup is shown in a tipped, drinking position.

FIG. 8 is a perspective view of an inner/lid component of the cup of FIG. 5. FIG. 8A is a side view of the inner/lid component.

DETAILED DESCRIPTION

Figure 1:
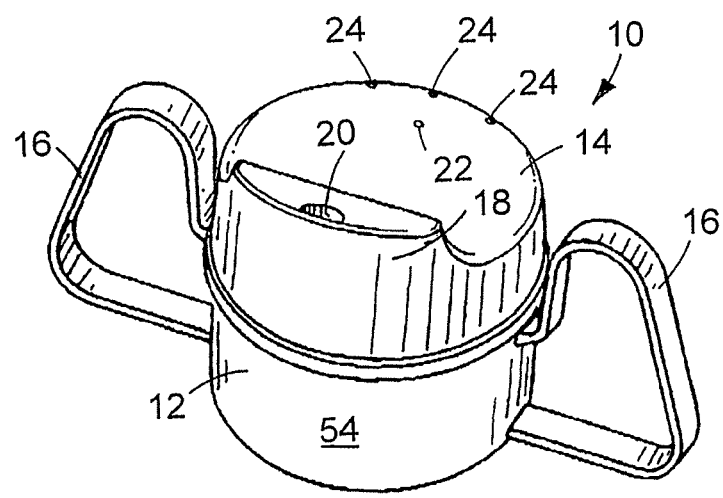
FIG. 1 is a perspective view of a cup according to one embodiment of the invention.
Figure 1C:
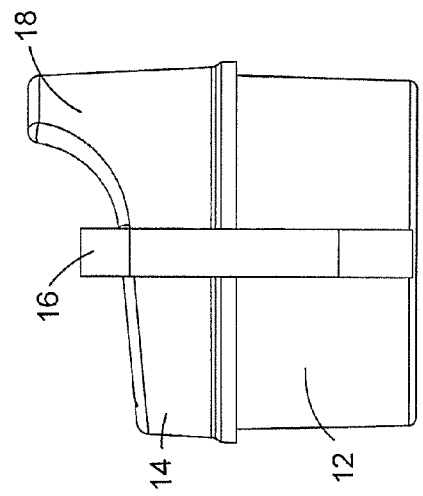
FIGS. 1A-1C are front, top and side plan views, respectively.
Figure 1B:
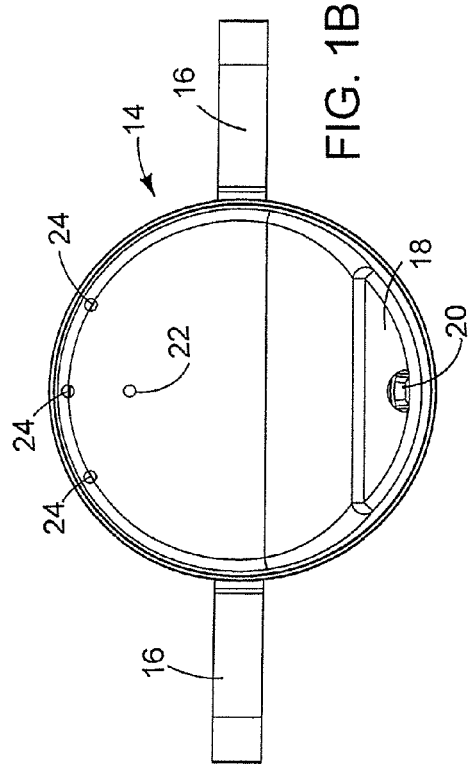
Figure 1A:
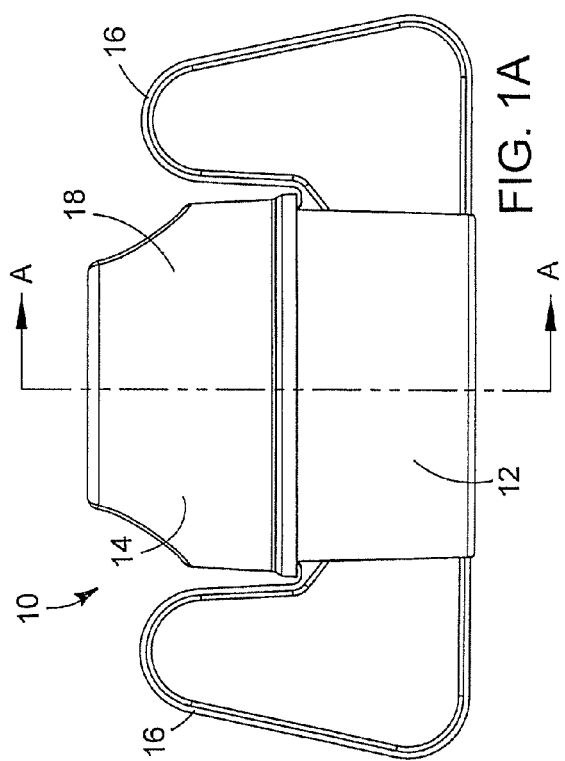
Figure 3:
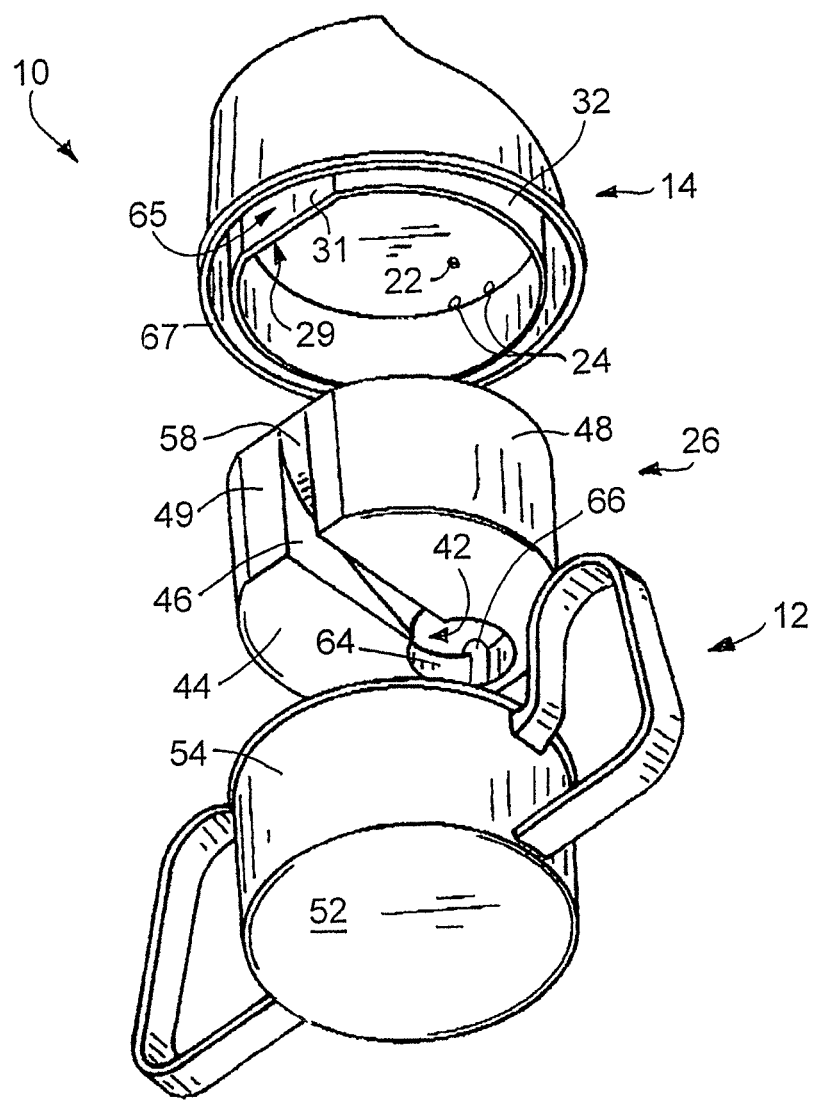
FIGS. 3, 3A and 3B are exploded perspective views of the cup of FIG. 1, taken from different angles.

Referring to FIG. 1, limited flow cup 10 includes an outer cup 12 including a generally cylindrical side wall 54 and a generally flat bottom surface 52 (FIG. 3). A pair of handles 16 extend from side wall 54. A cover 14 is constructed to be sealingly attached to the outer cup 12. As shown in FIGS. 1A and 1B, the cover 14 includes a drinking spout 18 having an aperture 20 through which a user of the cup can sip a liquid. The cover also includes a vent hole 22 to allow air to enter the cup as fluid is depleted and thereby allows liquid to flow out of the inner cup unimpeded, and three "anti-suck" holes 24, the function of which will be discussed below.

Figure 2:
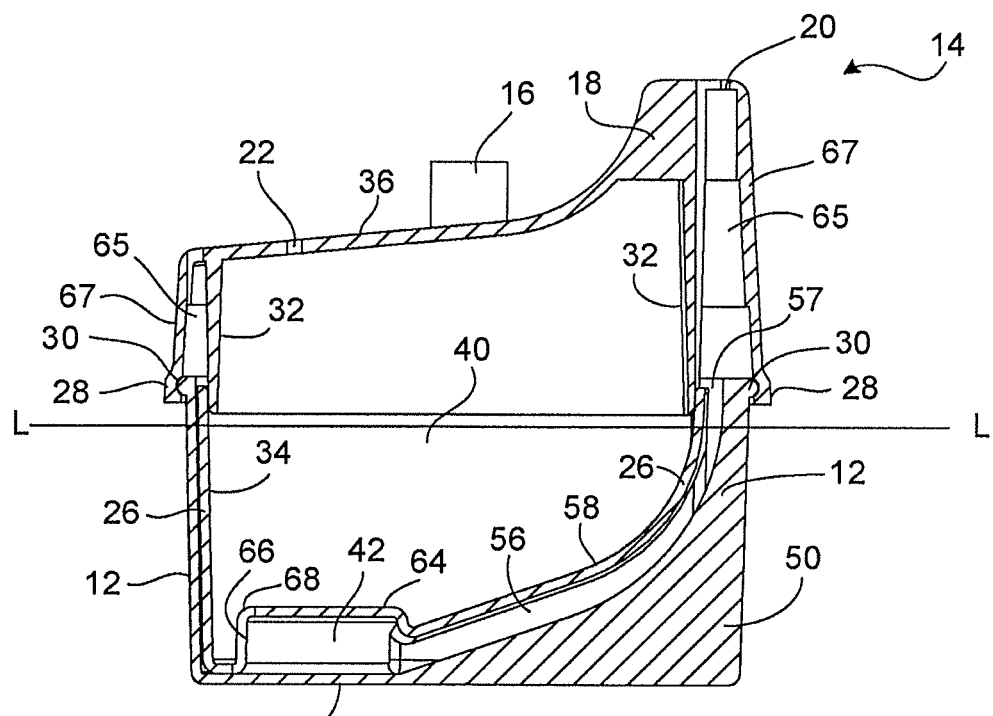
FIGS. 2 and 2A are cross-sectional views of the cup of FIG. 1, taken along line A-A of FIG. 1A.

Referring to FIG. 3, the limited flow cup 10 further includes a generally cylindrical inner cup 26 that is slightly smaller in outer diameter than the inner diameter of the outer cup 12, and slightly shorter than outer cup 12, so that the inner cup 26 can be received within the outer cup 12 in nested engagement as shown in FIG. 2. A clearance of 0.005 to 0.010 inches would ensure that the cups could be easily nested and un-nested and at the same time ensure that very little liquid-holding volume is created between the cups. The inner cup 26 fits snugly within the outer cup 12, and defines a reservoir 38 for holding a liquid. The inner and outer cups include structural features that together define a metering chamber when the cups are nested, as will be discussed below.

Figure 3A:
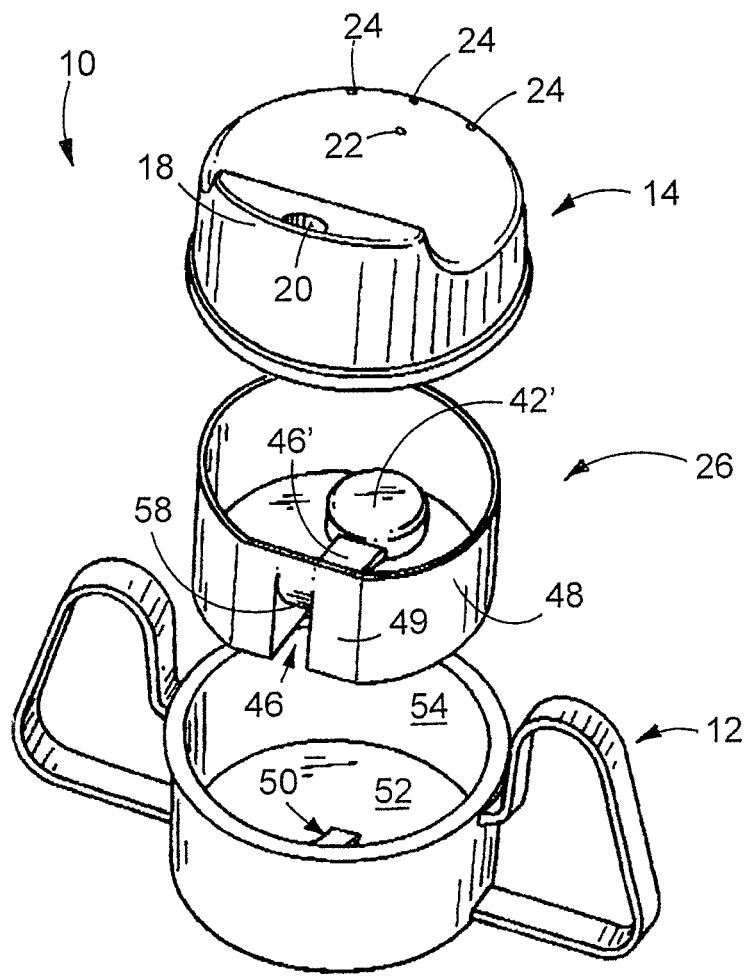

As shown in FIG. 3, the inner cup 26 includes a generally flat bottom surface 44 and a generally cylindrical side wall 48, having a locally flat portion 49. A disc-shaped cavity 42 is formed by an indentation 64 in bottom surface 44. A channel 46, defined by a diagonally cut groove in the inner cup 26, defines a triangular volume extending from the cavity 42 up the outer side wall 48 of the inner cup. (Seen from above, in FIGS. 3A and 3B, the cavity 42 and channel 46 look like a protrusion 42' and a ridge 46', respectively.)

Figure 3B:
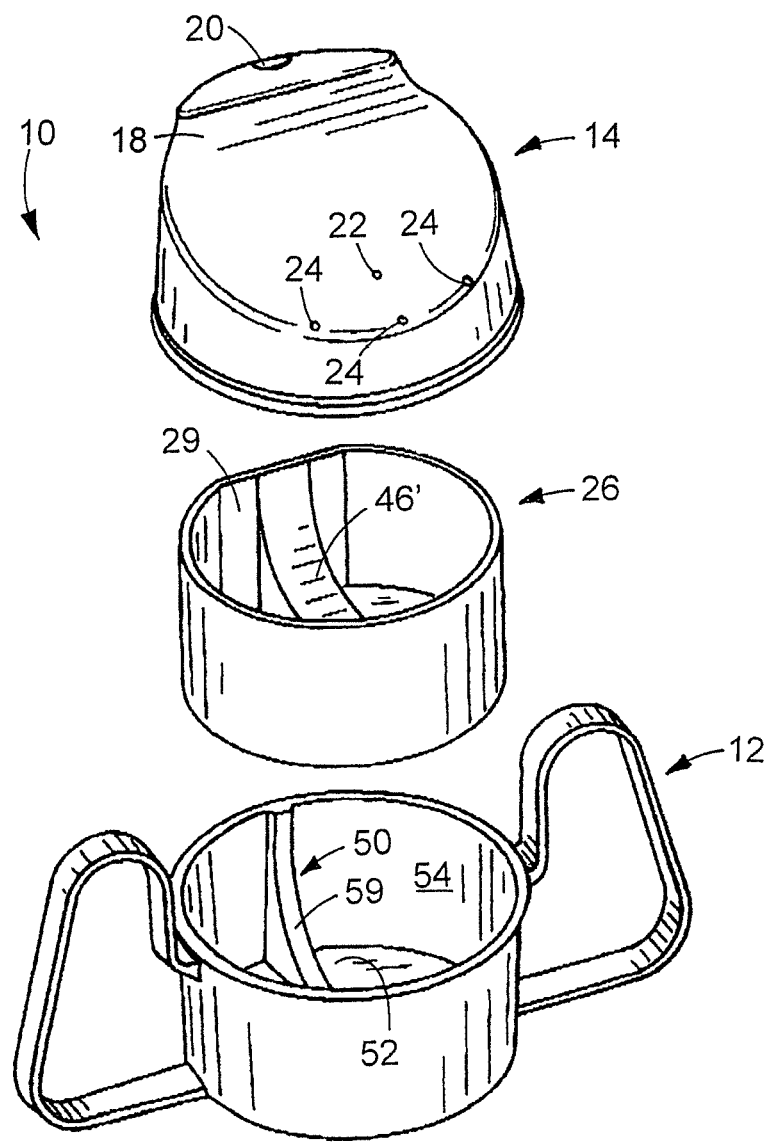

As shown in FIG. 3B, the inner surface of outer cup 12 includes an elongated generally triangular ridge 50 that extends along part of the bottom surface 52 and extends up the inner surface of side wall 54 of the outer cup 12.

Figure 2A:
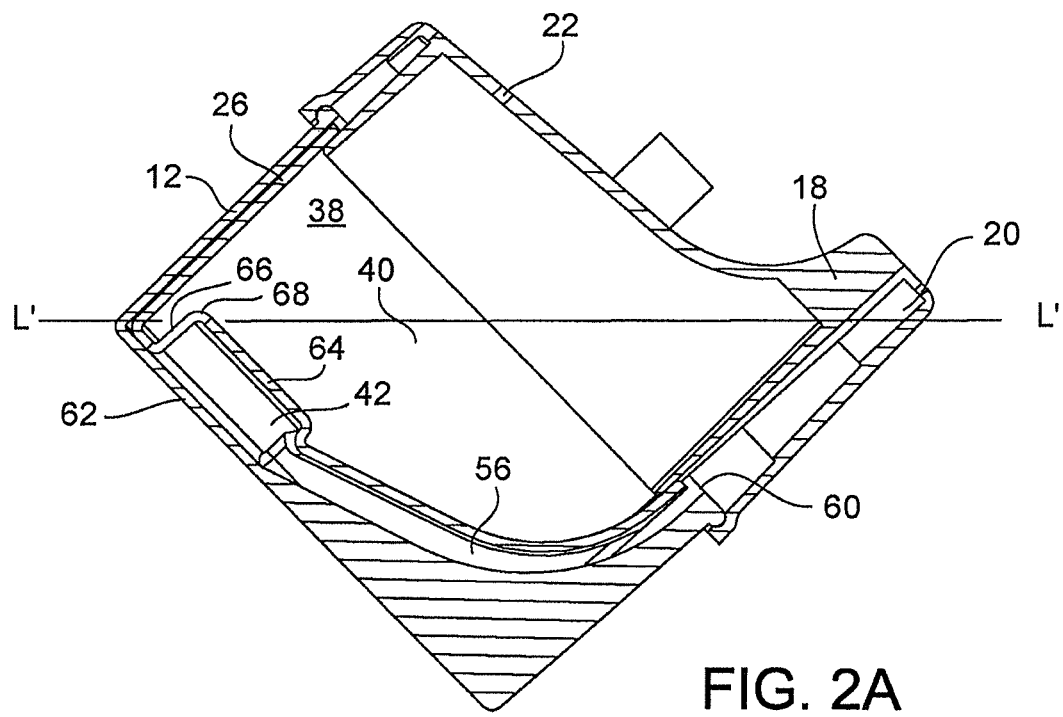

When the inner cup 26 and outer cup 12 are nested (as shown in FIGS. 2-2A), the cavity 42 is closed from below by the generally flat bottom surface 62 of the outer cup 12. Ridge 50 nests within channel 46 (FIG. 3), filling most of the volume of the channel, i.e., the width of the ridge is nearly that of the channel, so that a seal will be formed between the ridge and channel. The ridge 50 is slightly shorter than the depth of the channel, so that an elongated fluid passage 56 (FIG. 2) is defined between the "hypotenuse" or top surface 59 (FIG. 3B) of the ridge and the upper wall 58 of the channel. Elongated fluid passage 56 extends diagonally from the cavity 42, with which it is in fluid communication, to the rim 60 of the nested inner and outer cup assembly. The elongated fluid passage 56 ends in an open terminus 57 at rim 60. The cavity 42 communicates with the inside of inner cup 26 by way of an aperture 66 in the wall 68 of cavity 42 that is located diametrically opposite the inlet of elongated fluid passage 56.

In addition to defining the metering chamber, the engagement of ridge 50 with channel 46 self-aligns the inner and outer cups, so that the limited flow cup is easy for a caregiver or patient to assemble correctly.

When the cup is in its upright position, shown in FIG. 2, liquid 40 flows into cavity 42 through aperture 66, until the cavity 42 is full and liquid is also present in the elongated fluid passage 56 up to the liquid level L. The cavity 42 and elongated fluid passage 56 together define a metering chamber. The total volume of liquid that is in the metering chamber when the device is tipped to a drinking position (FIG. 2A) is the volume of liquid that will be delivered to the user through aperture 20. The volume delivered to the user will vary slightly as the liquid level in the cup drops, due to the reduced volume of liquid that will be present in the elongated fluid passage 56. The volume of the cavity is much larger than that of the elongated fluid passage (generally the ratio of the volume of the elongated fluid passage to that of the cavity is about 1:4 to 1:10). As a result, the volume of the cavity dominates, and the user will receive essentially the same amount of liquid regardless of the level of fluid in the elongated passage, which will be reduced as the liquid in the cup is depleted. It is also noted that the user may not receive the entire volume present in the metering chamber, depending on the angle to which the user tips the device (e.g., it may be necessary to tip the device well beyond the angle shown in FIG. 2A (generally to about 90 degrees from the position shown in FIG. 2) to receive the entire volume in the metering chamber.)

As discussed above, cover 14 includes a drinking spout 18. Spout 18 is located diametrically opposite the cavity 42, to properly orient the cup as will be discussed below. The spout extends relatively high above the upper surface of the cover, and joins with the cover in a smoothly curved surface, to allow the user to drink from the cup without tilting his head back, i.e., to drink in what is sometimes referred to as a "chin tuck" position. This position is generally thought to be a safer drinking position for patients suffering from dysphagia. The cover 14 is also quite tall, relative to the height of the inner and outer cups, for reasons which will be explained below.

Cover 14 also includes a generally cylindrical outer sleeve 28 that is coextensive with the outer surface of the cover and is dimensioned to engage rim 30 of cup body 12 in an interference engagement. Cover 14 also includes, extending downwardly from its inner top surface, a generally cylindrical inner sleeve 32 that is generally coaxial with the outer sleeve 28. Inner sleeve 32 is dimensioned to fit within and sealingly engage the inner wall 34 of inner cup 26 to provide a fluid-tight seal. To allow the cover to be easily snapped onto the nested inner and outer cups, and to facilitate fluid-tight sealing, the cover is preferably formed of a resilient material.

An annular channel 65 is defined between the outer wall 67 of the cover and the inner sleeve 32 (see FIGS. 2 and 3). This annular channel 65 is in fluid communication with the open terminus 57 of the elongated fluid passage 56, and also with aperture 20 in the spout 18. Thus, during drinking (FIG. 2A), fluid flows from the elongated fluid passage 56, into the annular channel 65, and through aperture 20 to the user. As shown in FIG. 3, a portion 31 of the inner sleeve 32 is flattened, to provide a relatively large volume in the area of the annular channel that is adjacent terminus 57, allowing good flow of fluid to the aperture 20. The flattened portion 31 of the inner sleeve 32 is also geometrically similar to a flat surface 29 (FIG. 3B) on the inside of the inner cup 26, adjacent to the open terminus 57 of the elongated fluid passage 56, thereby allowing surface 31 of the inner sleeve 32 to seal to surface 29 of the inner cup 26.

Annular channel 65 also communicates with "anti-suck" holes 24. The "anti-suck" holes 24 allow air to pass into the annular channel 65 in the event that the user sucks on the spout 18, in an attempt to aspirate liquid from the device without tilting the device to a drinking position and thereby activating the limited flow function (discussed below). The "anti-suck" holes 24 prevent the pressure in the annular channel 65 from being lowered sufficiently for fluid to be drawn up into the spout 18, thereby preventing the user from circumventing the limited flow function of the cup. It is preferred that the cover include a plurality of "anti-suck" holes, as shown, rather than a single hole, because it is unlikely that a user would inadvertently cover multiple holes with a finger during use of the cup.

Preferably, the inner and outer cups and the cover are formed by injection molding. Suitable materials for the inner and outer cup include thermoplastic polymers such as polyethylene, polypropylene, polyamides, such as Nylon, and polycarbonate. Thermosets may also be used. Suitable materials for the cover include relatively compliant thermoplastic polymers, such as polypropylene, polyethylene, polyurethanes, plasticized polyvinyl chloride (PVC), and thermoplastic elastomers (TPEs).

When the cup is to be used, the inner cup is nested within the outer cup, and the inner cup is filled with a liquid to or above a fill line (not shown) on its inner wall 34. (The fill line indicates the amount of liquid that should be added in order for the cup to initially contain the advertised volume of the cup, e.g., 8 fluid ounces.) The inner cup 26 can be filled up to its rim, if desired, without any problems in metering of the liquid 40, for reasons that will be discussed below. The fill line is preferably ⅛ to ⅜ inch below the rim, so that the cup may be filled with its advertised volume and the lid snapped in place without spilling liquid from the cup. Once the inner cup is filled, the cover 14 is then snapped onto the cup assembly, so that the cover and the rims of the inner and outer cups are in sealing engagement. As shown, e.g., in FIG. 3B, the top surface 59 of the ridge 50 is slightly convex, as is the corresponding upper wall 58 of channel 46. The curvature of surface 59 allows surface 59 to be relatively vertical near the rim of outer cup 12, and, similarly, the curvature of wall 58 allows wall 58 to be relatively vertical near the rim of inner cup 26. These vertical surfaces, and the relatively small interruption of the circularity of the rims of the inner and outer cups facilitates the sealing engagement of the inner and outer sleeves of the cover 14 with the rims of the cups. To drink from the device, the user places the spout 18 to his lips and tilts the cup in a normal drinking manner.

When the user tips the cup to a drinking position, as shown in FIG. 2A, the volume of liquid in the metering chamber is delivered to the user through aperture 20. As the cup is tipped to a drinking position, liquid flows within the inner cup 26 so that level L' remains horizontal. The inner cup and cover are dimensioned, and the cavity 42 and aperture 66 are oriented, so that before the angle of tilt of the cup is such that liquid will flow out of the spout 18 (typically at least about 30 degrees from the horizontal) the aperture 66 will be exposed above the liquid level L' in the inner cup 26, as shown in FIG. 2A. Because the aperture 66 is above the liquid level L', liquid will not flow into aperture 66 when the cup is tilted further for drinking, and thus the user will receive only the volume of liquid in the metering chamber, as discussed above. To drink more liquid, the user must return the cup to its upright (or nearly upright) position, allowing the user time to swallow the predetermined volume of liquid. Because spout 18 is located diametrically opposite the cavity 42, as discussed above, the user will always orient the cup so that the aperture 66 will be above the liquid level during drinking, as shown in FIG. 2A.

It is important that the limited flow cup perform its metering function the first time (and every subsequent time) that the cup is used, and that it perform the metering function regardless of how full the inner cup 26 is filled. In other words, it is important that the limited flow function of the cup not be circumvented by over-filling the inner cup 26, and that the amount of liquid dispensed to the user never exceed the maximum volume of the metering chamber. Preferably, the amount of liquid dispensed to the user is approximately same (e.g., vary by no more than 25%) whether the inner cup is 10% full or 100% full.

In order for the metering function to be performed every time the cup is used, regardless of the fill level, two conditions must be met: (a) there must be a sufficient volume of air within the cup to allow the liquid to flow to the position shown in FIG. 2A when the cup is tilted, and (b) there must be sufficient open area in the cover on the spout side to allow all of the liquid in the cup (up to the maximum volume that the inner cup can contain) to be below line L' in FIG. 2A when the cup is inclined at an angle at which fluid first begins to flow out of the aperture 20.

The first condition can be met by making the cover 14 is quite tall, relative to the height of the inner and outer cups, as shown in the figures. As a result of the height of the cover, the inner sleeve 32 and wall 36 together define a relatively large open volume or "headspace" that cannot be filled with liquid when the user fills the inner cup. This headspace allows the liquid to be displaced within the cup as shown in FIG. 2A when the cup is tilted (i.e., allows the cup to meet condition (a), above). For the cover geometry shown in FIGS. 2-2A, the volume of the headspace defined by the cover is generally about 28% to 40% of the volume of the inner cup.

However, the total headspace volume required to satisfy both conditions will depend upon the geometry of the cover, e.g., the total volume required will be less if the volume defined by the drinking spout (the volume on the side of the cup into which the liquid flows when the cup is tilted to drink) is increased. In order to satisfy condition (b), it is important that, of the total volume of the headspace, a sufficient amount is disposed on the side of the cup into which the liquid flows when the cup is tilted to drink so that the level of the liquid will never be above line L' when the cup is tilted to the angle at which liquid will begin to flow out of aperture 20. Also, for a given headspace, the higher the spout extends above the cover, the greater will be the tip angle required before liquid will flow from the aperture 20. The extra volume created by an extended drinking spout is created mostly in the annular volume, where it does not alter the fluid level dynamics in the volume enclosed by the inner cup and the headspace inside the lid's inner partition.

For a cup having an advertised volume of 8 fluid ounces, the preferred dimensions of the cup are as follows: the inner diameter of the inner cup 26 is from about 3.0 to 3.5 inches, the diameter of the inner sleeve of the cover is the same as the inner diameter of the inner cup 26, the height of the inner cup is from about 1.5 to 2.5, the height of the cover (exclusive of the spout) is from about 0.75 to 1.25 inches, and the height of the spout above the top of the cover is about 0.75 to 1.25 inches. The volume of the cup may be altered, e.g., by scaling all dimensions proportionally.

Other embodiments are within the scope of the following claims.

Figure 4:
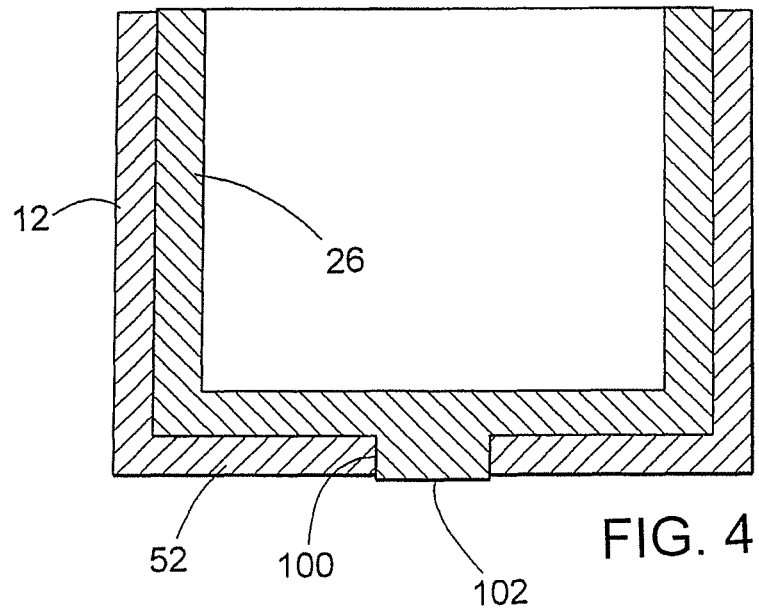
FIGS. 4 and 4A are schematic cross-sectional views illustrating alternate structures for preventing the use of the outer cup as a drinking cup.
Figure 4A:
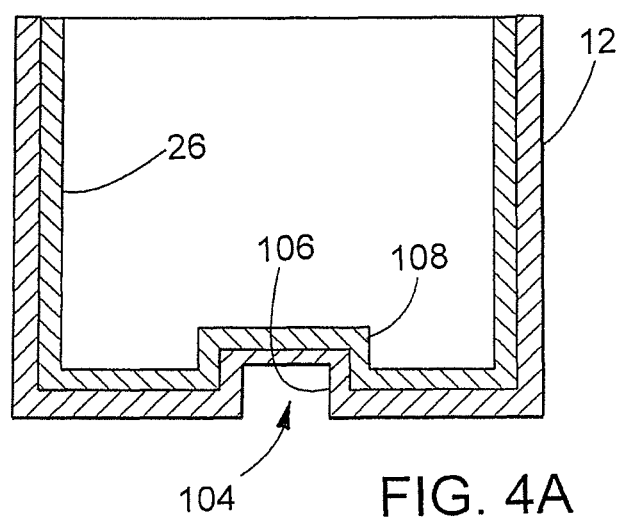

It is generally desirable to prevent the user of the limited flow cup, or a caregiver, from circumventing the metering feature of the limited flow cup by using the outer cup 12 alone, without the inner cup 26. This may be accomplished in a variety of ways, as will be apparent to those skilled in the art. Two examples are illustrated in FIGS. 4 and 4A. As shown in FIG. 4, the outer cup 12 may include an aperture 100 in its lower surface, and the inner cup 26 may include a plug 102 that seals the aperture 100 when the cups are properly nested. Alternatively, as shown in FIG. 4A, the outer cup 12 may include a bore 104 having a rim 106, and the inner cup 26 may include an annular recess 108 that is constructed to fit sealingly over the rim 106.

For example, the cavity need not be disc-shaped, but could be square, rectangular, or any other desired shape. The ridge in the outer cup can be omitted, and the channel defined by a groove in the inner cup and a cylindrical inner wall of the outer cup. Also, while the ridge is shown and described as having a slightly curved "hypotenuse", the ridge may be more triangular in shape. Many other alterations of the structural features of the inner and outer cup may be made, provided that the nested arrangement of the inner and outer cup defines the metering chamber.

The cup has been shown as having two handles. However, in other embodiments the cup may have a single handle or no handle.

While the cover has been shown and discussed as being relatively tall, and having a tall, curved spout, many other cover designs may be used. Suitable cover geometries will depend upon the volume of the cup and the application in which it will be used, as will be readily understood by those skilled in the art.

The cup may be used in many applications, other than by dysphagia sufferers, e.g., as a travel coffee mug, as an infant "dripless" cup, or as a disposable container for beverages such as nutritional drinks. When the cup is used to dispense hot beverages, the double-walled construction may afford a degree of thermal insulation. Depending on the application, the volume of the cavity may vary widely, e.g., from 1 to 20 ml.

Figure 5:
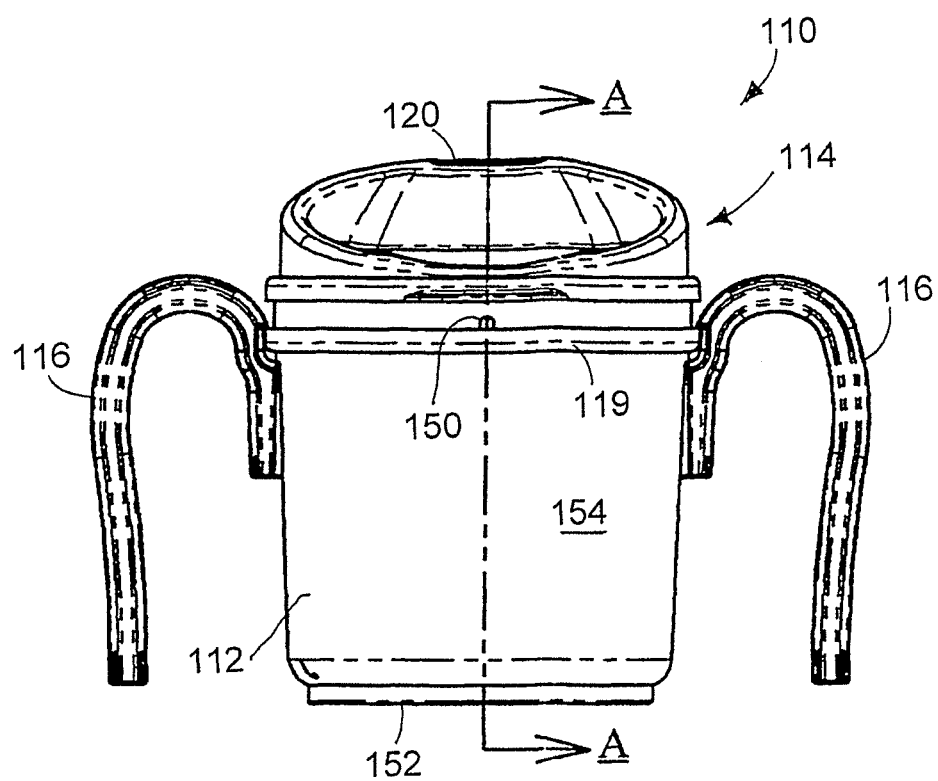
FIG. 5 is a perspective view of a cup according to an alternative embodiment of the invention.
Figure 5A:
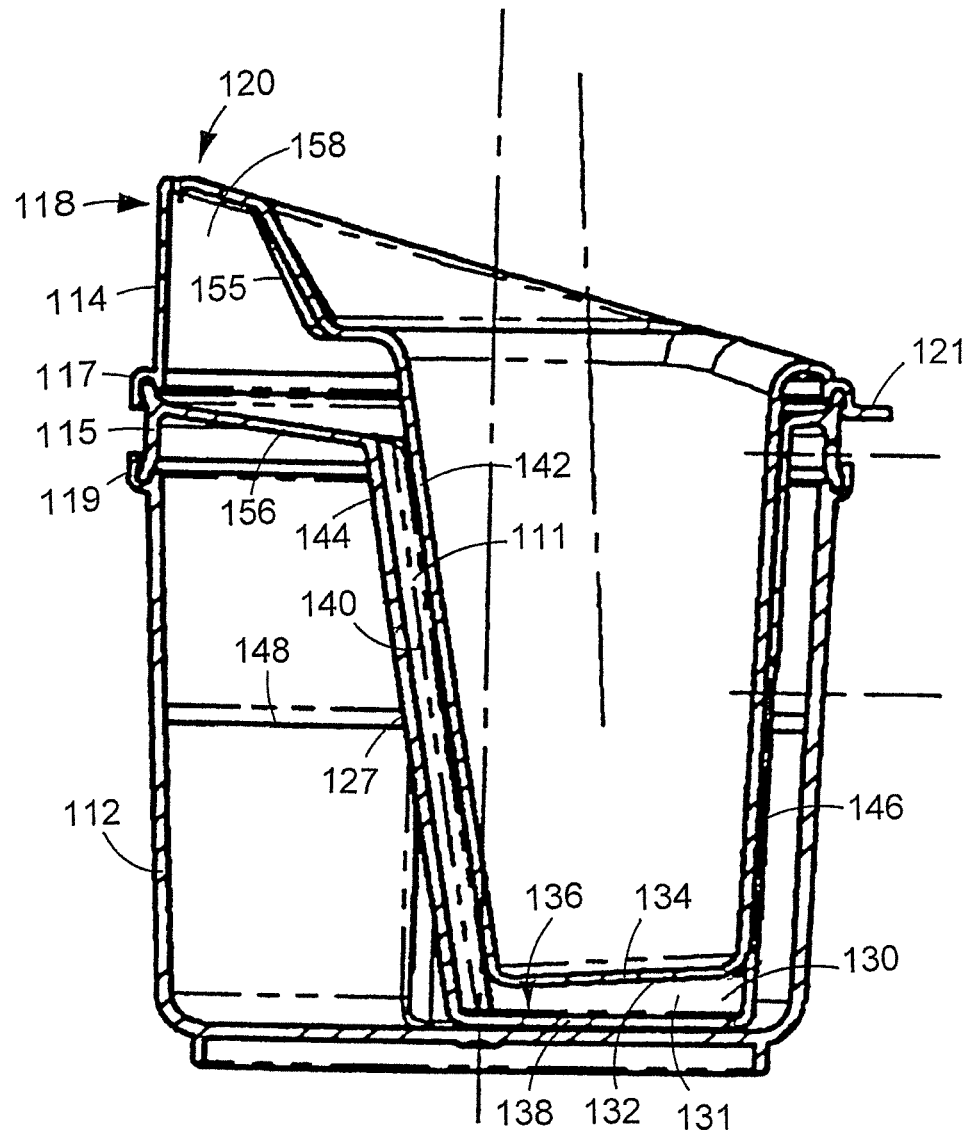
FIG. 5A is a cross-sectional view of the cup, taken along line A-A in FIG. 5.
Figure 5B:
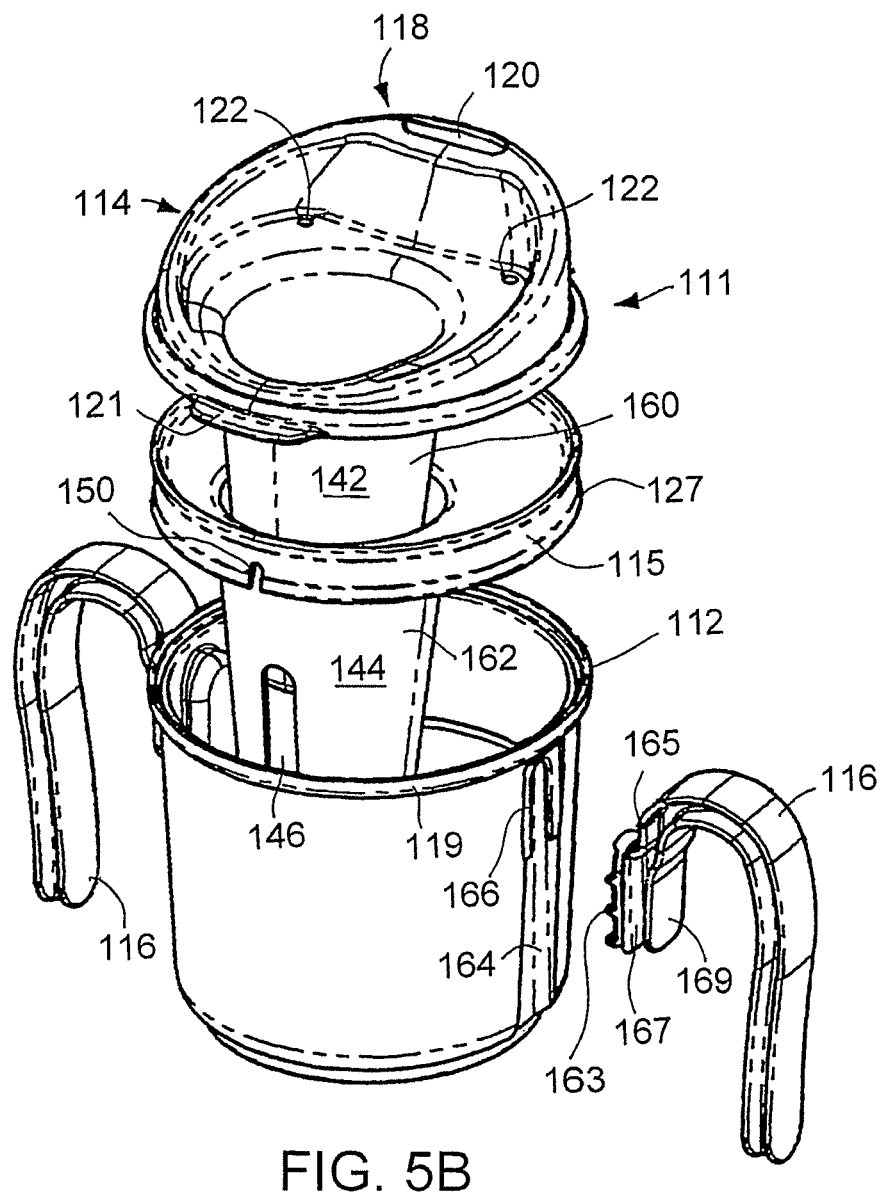
FIG. 5B is a partially exploded view of the cup of FIG. 5.

An alternative limited flow cup 110 is shown in FIGS. 5-5B. As shown in FIG. 5B, limited flow cup 110 includes an outer cup 112 and, nested within outer cup 112, an inner cup 111 and a middle cup 127. Inner cup 111 defines a cylindrical body 160, and a cover portion 114 that includes a drinking spout 118 having an aperture 120 through which a user of the cup can sip a liquid. The cover portion 114 also includes a pair of anti-suck vents 122 (FIG. 5B), which function, as described above, to prevent a user from aspirating liquid from the device without tilting the device to a drinking position. Middle cup 127 defines a cylindrical body 162 and a rim portion 115.

Middle cup 127 is configured to be received between the outer cup 112 and the inner cup 111 in nested engagement. In this embodiment, it is the cylindrical bodies 160, 162 of the inner and middle cups that include structural features that together define a metering chamber when the cups are nested. The manner in which the metering chamber is defined by the inner and middle cups will be discussed in detail below. The fluid is retained in the outer cup, with a metered amount being delivered to the metering chamber through an opening 146 in the middle cup.

As shown in FIG. 5A, the nested arrangement of the inner cup 111 and middle cup 127 defines a metering chamber 130. Metering chamber 130 includes a cavity 131 defined between the lower surface 132 of the bottom wall 134 of inner cup 111 and the upper surface 136 of the bottom wall 138 of the middle cup 127. Metering chamber 130 also includes a fluid passage 140 that is defined between the side walls 142 and 144 of the inner cup 111 and middle cup 127, respectively, and which provides fluid communication between the cavity 131 and the aperture 120. Side walls 142 and 144 are angled in the area of the fluid passage 140, so that the fluid passage extends diagonally from the cavity 131 toward the aperture 120. As in the embodiment shown in FIGS. 1-3B, the cavity 131 is positioned diametrically opposite to aperture 120, to properly orient the cup. Preferably, side walls 142 and 144 extend at an angle of about 4 to 6 degrees from the vertical (the axis of the outer cup).

The inner wall 155 of the cover portion 114, and the upper wall 156 of the middle cup 127 define an annular channel 158, as shown in FIG. 5A. As discussed above with respect to FIGS. 1-3B, this annular channel provides good fluid flow from the fluid passage 140 to aperture 120.

Features of the outer, middle and inner cups will now be described in further detail.

Figure 6:
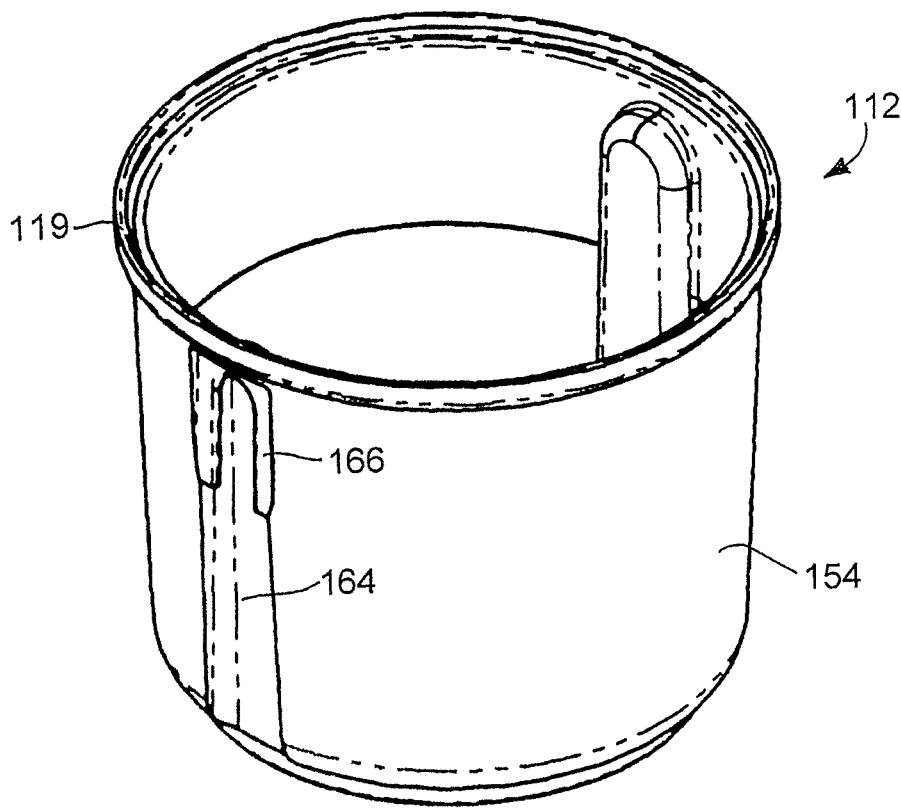
FIG. 6 is a perspective view of an outer component of the cup of FIG. 5.
Figure 6A:
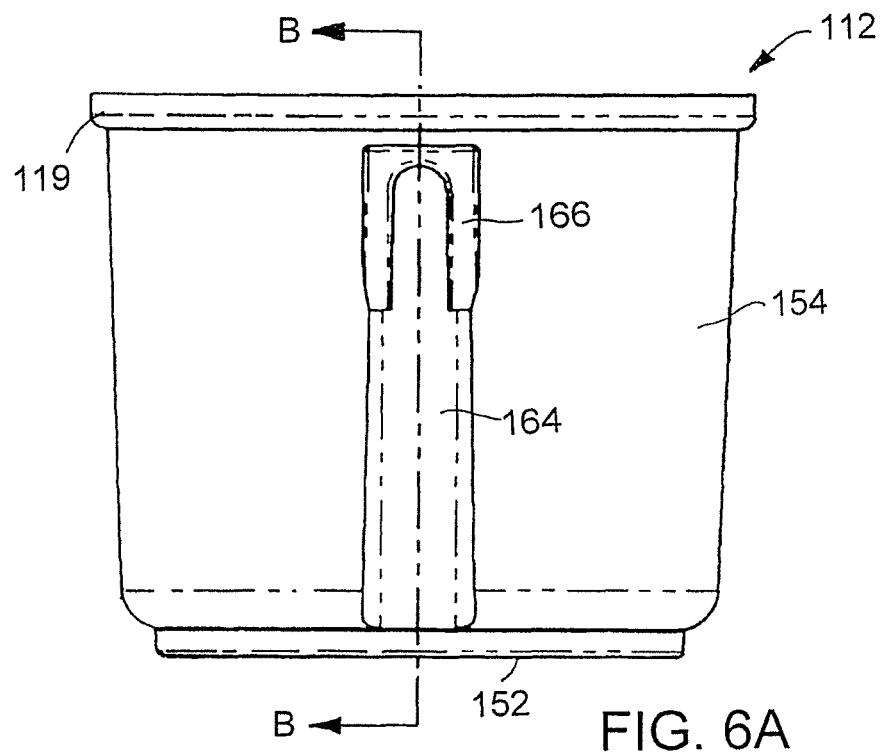
FIG. 6A is a side view of the outer component.
Figure 6B:
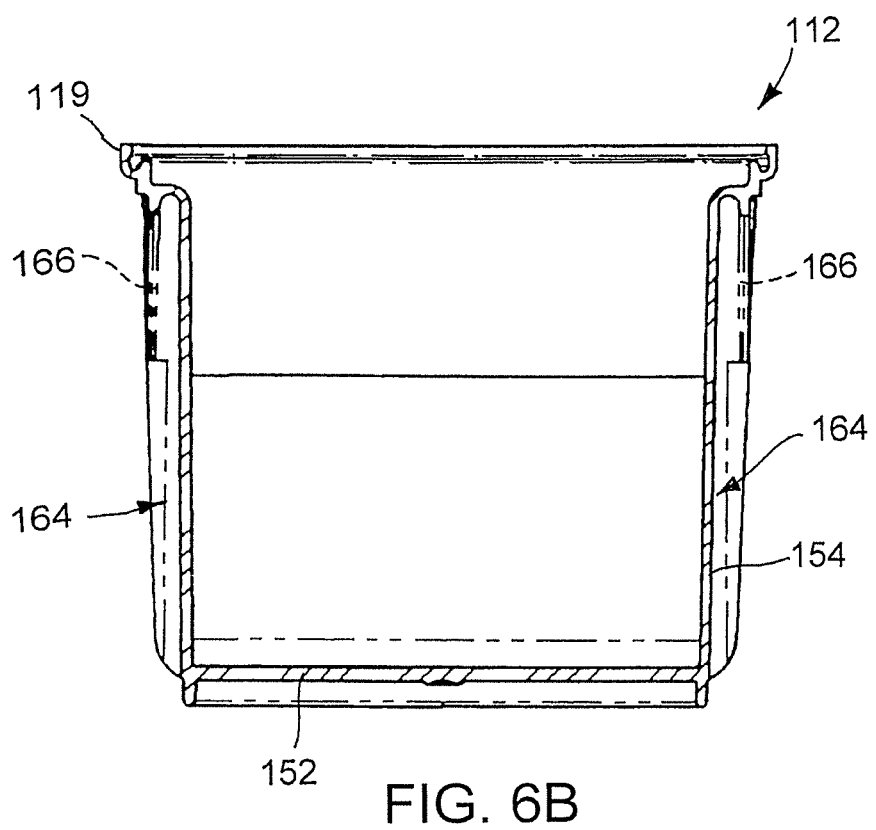
FIG. 6B is a cross-sectional view of the outer component, taken along line B-B in FIG. 6A.
Figure 9:
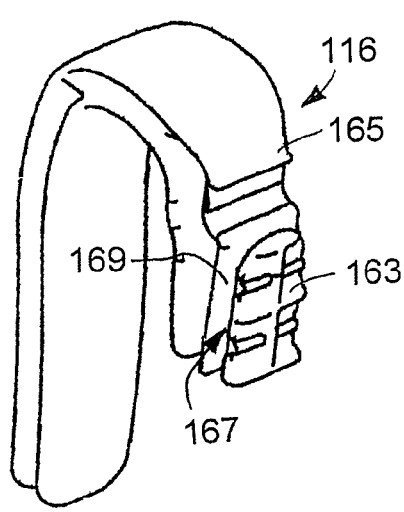
FIGS. 9-9C are, respectively, a perspective view, a top view, an end view and a side view of a handle for use with the cup of FIG. 5.
Figure 9A:
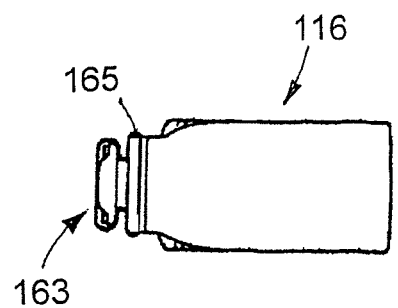
Figure 9B:
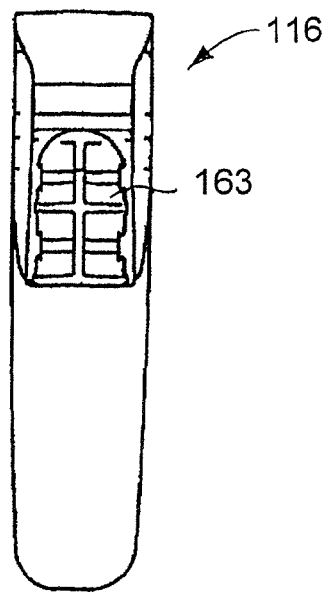
Figure 9C:
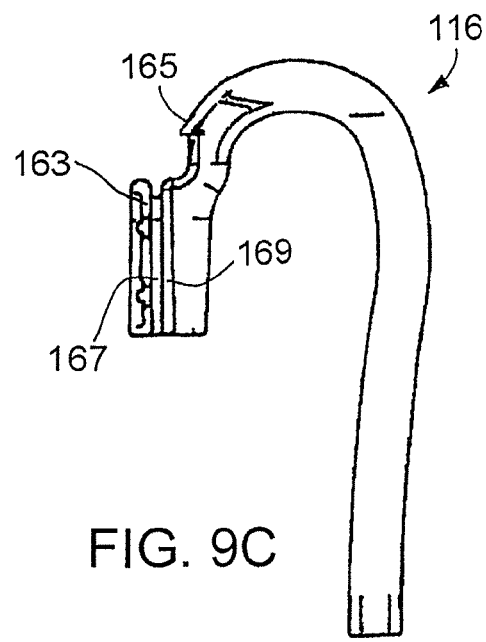

Referring to FIGS. 6-6B, the outer cup 112 includes a generally cylindrical side wall 154 and a generally flat bottom surface 152. The side wall 154 includes a pair of channels 164, dimensioned to receive handles 116, as indicated in FIG. 5B, and a pair of retaining members 166, which retain the handles 116 in channels 164. The handles 116, one of which is shown in detail in FIGS. 9-9C, each include an interlocking member 163 that is configured to fit within channel 164 and under retaining member 166. An open area 167 is provided between the interlocking member 163 and the body of the handle 169 to receive the retaining member 166. The handles also include a rib 165 that is configured to fit over the rim 119 of the outer cup, as shown in FIG. 5. To attach a handle, the user slides the interlocking member 163 up the channel 164 and under the retaining member 166, until the rib 165 snaps in place over the rim 119. Once attached, the handles are held securely in place and are difficult to remove so that they will not be removed inadvertently.

Figure 7:
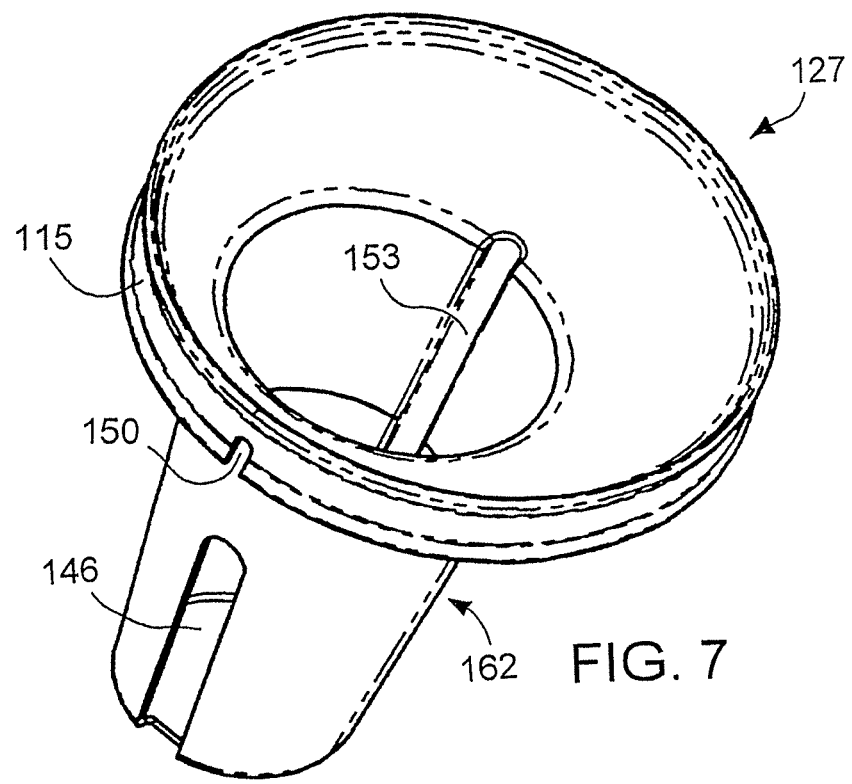
FIG. 7 is a perspective view of a middle component of the cup of FIG. 5.
Figure 7A:
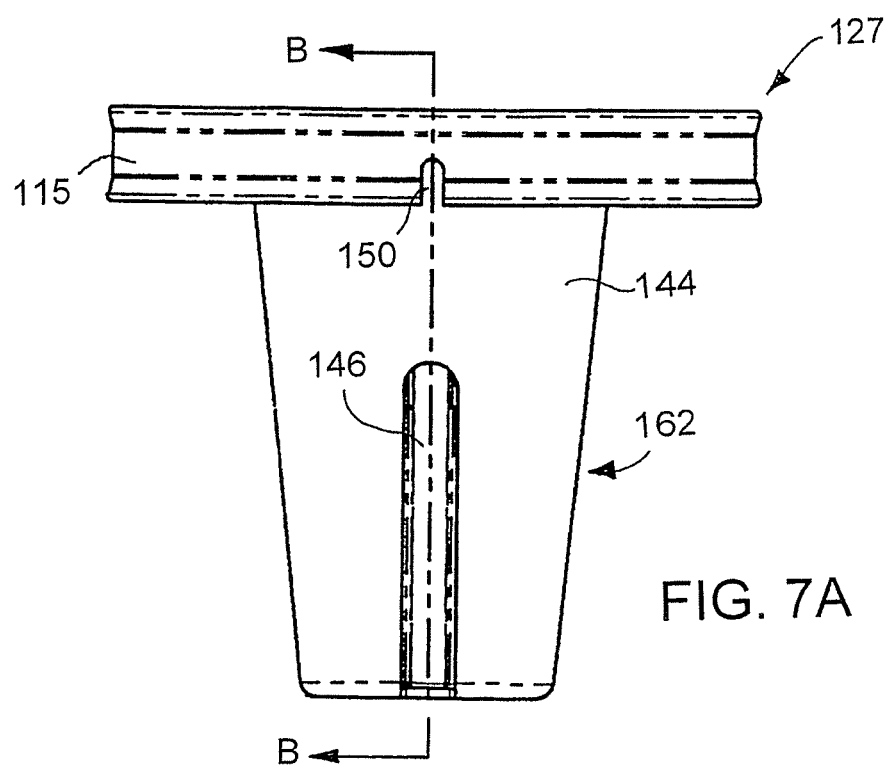
FIG. 7A is a side view of the middle component.
Figure 7B:
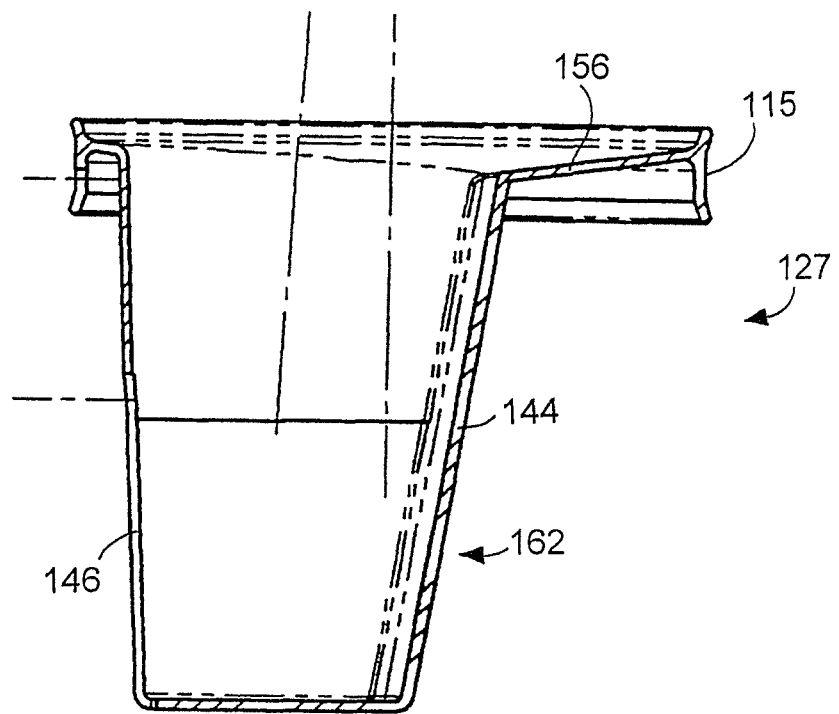
FIG. 7B is a cross-sectional view of the outer component, taken along line B-B in FIG. 7A.

Referring to FIGS. 7-7B, the middle cup 127 includes an opening 146, discussed above, that is positioned to allow fluid to flow from the outer cup 112 into the metering chamber 130. Opening 146 is configured so that, when the cup is tipped by the user during drinking, only a limited amount of liquid will flow into the metering chamber before the liquid level of the cup is above the intersection of the opening 146 and the inner cup 111.

As shown in FIG. 7, the middle cup 127 also includes a channel 153 that, with the side wall 142 of the inner cup, defines the fluid passage 140. The remainder of the side wall 144 of the middle cup 127 corresponds closely to the outer diameter of the inner cup 111, for a snug nested fit. This snug nested fit prevents fluid from flowing between the inner and middle cups except in the area of the fluid passage 140.

Again referring to FIGS. 7-7B, the rim 115 of middle cup 127 includes a vent groove 150 that, when the rim 115 is sealingly engaged with the rim 119 of the outer cup, as discussed below, provides an opening that allows air to enter the outer cup, preventing a vacuum from being created as liquid is dispensed. As shown in FIG. 5, when the limited flow cup is assembled the vent opening is diametrically opposite the aperture 120 to reduce spillage.

Figure 8B:
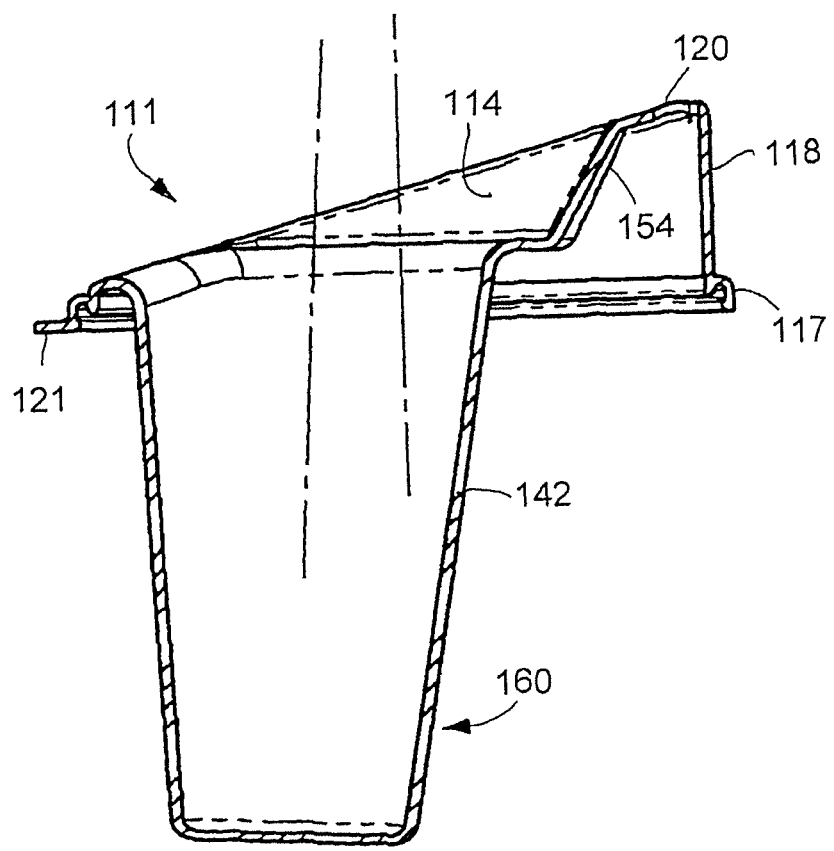
FIG. 8B is a cross-sectional view of the outer component, taken along line B-B in FIG. 8A.

Referring to FIGS. 8-8B, the inner cup 111 includes a body 160 and a cover portion 114, as discussed above. The cover portion 114 includes a sealing rim 117 that is constructed to sealingly engage rim 115 of middle cup 127. Rim 115 is constructed, in turn, to sealingly engage rim 119 of outer cup 112, as shown in FIG. 5A The rims engage each other by a snug interference fit, providing a fluid-tight seal and preventing the cup assembly from inadvertently coming apart during use. A tab 121 extends from rim 117, to allow the cover portion to be easily disengaged from the middle cup for cleaning and filling of the limited flow cup. The cover portion also is configured to define the annular channel 158, as discussed above.

When the user purchases the cup, the handles are not attached to the outer cup, allowing the user to choose whether to use one left- or right-handed handle, or two handles. Thus, before the first use of the cup, the user attaches one or both of the handles, by sliding interlocking member 163 of the handle 116 into channel 164 on the outer cup 112 and under retaining member 166, as described above.

To use the cup, the user fills the outer cup to the level indicated by fill line 148 (FIG. 5A). The user then assembles the outer, middle and inner cups, snapping the rims together securely. Generally, the user assembles the cups so that the aperture 120 of spout 118 is at roughly a 3 O'Clock position around the circumference of the outer cup, relative to the handles at 12 O'Clock. However, in this embodiment the spout may be positioned in any desired circumferential orientation relative to the handles (so long as the rib 165 of the handles does not interfere with the vent opening). To drink from the device, the user places the spout 118 to his lips and tilts the cup in a normal drinking manner.

When the user tips the cup to a drinking position, the volume of liquid in the metering chamber is delivered to the user through aperture 120. As the cup is tipped to a drinking position, liquid flows within the outer cup 112 so that the liquid level remains horizontal. The inner cup and cover are dimensioned, and the cavity 131 and aperture 120 are oriented, so that before the angle of tilt of the cup is such that liquid will flow out of the spout 118 (typically at least about 30 degrees from the horizontal) the open portion of aperture 146 (the portion below the intersection of aperture 146 with inner cup 111) will be exposed above the liquid level in the outer cup 112. Because the aperture 146 is above the liquid level in the outer cup, liquid will not flow into aperture 146 when the cup is tilted further for drinking, and thus the user will receive only the volume of liquid in the metering chamber, as discussed above. To drink more liquid, the user must return the cup to its upright (or nearly upright) position, allowing the user time to swallow the predetermined volume of liquid. Because spout 118 is located diametrically opposite the cavity 131, as discussed above, the user will always orient the cup so that the aperture 146 will be above the liquid level during drinking.

What is claimed is:

1. A limited flow cup, comprising:
   an outer cup comprising an outer-cup generally-flat bottom surface and an outer-cup generally-cylindrical side wall;
   an inner cup in nested relationship with the outer cup, the inner cup comprising an inner-cup bottom surface and an inner-cup side wall, wherein at least a portion of the inner-cup bottom surface contacts at least a portion of the outer-cup generally-flat bottom surface when the inner cup and the outer cup are in the nested relationship, the inner-cup side wall comprising a sloped surface defining a groove in the inner cup; and
   a cover that sealingly engages rims of the inner and outer cups and defines an opening through which the user can drink a fluid,
   wherein the limited flow cup defines a metering chamber constructed to contain an amount of fluid for delivery to a user during a drinking motion, the metering chamber comprising a cavity at least partially defined by the inner cup and an elongated fluid passage in fluid communication with the cavity at least partially defined by the groove in the inner cup.

2. The limited flow cup of claim 1 wherein the limited flow cup further defines a fluid reservoir, wherein the metering chamber includes an inlet through which fluid can flow from the fluid reservoir to the metering chamber, the inlet being configured to allow entry of fluid from the reservoir into the metering chamber when the limited flow cup is in a first position, and restrict entry of fluid from the reservoir into the metering chamber when the limited flow cup is in a second, tilted position.

3. The limited flow cup of claim 2 wherein the inlet is positioned so that it will be above the liquid level in the fluid reservoir when the limited flow cup is tilted during the drinking motion.

4. The limited flow cup of claim 2 wherein the inner cup defines the fluid reservoir.

5. A limited flow cup, comprising:
   an outer cup, an inner cup in nested relationship with the outer cup, and a cover that sealingly engages rims of the inner and outer cups and defines an opening through which the user can drink a fluid, wherein the limited flow cup defines a metering chamber constructed to contain an amount of fluid for delivery to a user during a drinking motion, the metering chamber comprising a cavity and an elongated fluid passage in fluid communication with the cavity, wherein the cavity is at least partially defined by an indentation in a surface of the inner cup, the metering chamber being configured to restrict the amount of fluid delivered to a user when the limited flow cup is tilted during the drinking motion, wherein the metering chamber is a cavity defined between the inner cup and the outer cup by an indentation in a lower surface of the inner cup and a lower surface of the outer cup.

6. The limited flow cup of claim 1 wherein a lower surface of the cover defines an annular channel that, when the cover is in place, is in fluid communication with the metering chamber.

7. The limited flow cup of claim 6 wherein the cover defines one or more apertures that communicate between the ambient air and the annular channel, allowing air to enter the annular channel.

8. The limited flow cup of claim 7 wherein the cover further defines a drinking spout, and the aperture(s) allow sufficient air to enter the annular channel so that a user of the limited flow cup is hindered from withdrawing fluid from the limited flow cup by sucking on the drinking spout.

9. The limited flow cup of claim 1 wherein the cover and an upper wall of the outer cup together define an annular channel that, when the cover is in place, is in fluid communication with the metering chamber.

10. The limited flow cup of claim 9 wherein the cover defines one or more apertures that communicate between ambient air and the annular channel, allowing air to enter the annular channel.

11. The limited flow cup of claim 10 wherein the cover further defines a drinking spout, and the aperture(s) allow sufficient air to enter the annular channel so that a user of the limited flow cup is hindered from withdrawing fluid from the limited flow cup by sucking on the drinking spout.

12. The limited flow cup of claim 1 further comprising a pair of regions constructed to receive a corresponding pair of handles.

13. The limited flow cup of claim 12 further comprising a handle constructed to be received by the regions and thereby securely attached to the limited flow cup.

14. The limited flow cup of claim 1 wherein the volume of said metering chamber is from about 4.5 to 5.5 ml.

15. The limited flow cup of claim 1 wherein the volume of said cavity is from about 3 to 5 ml.

16. The limited flow cup of claim 1 wherein the volume of said elongated fluid passage is less than about 25% of the total volume of the metering chamber.

17. The limited flow cup of claim 2 wherein the volume of the metering chamber is less than 10% of the volume of the fluid reservoir.

18. The limited flow cup of claim 1 wherein the cover defines a headspace volume that is from about 28% to 40% of the volume of the inner cup.

19. The limited flow cup of claim 2 wherein the amount delivered to the user when the reservoir is 100% full will be less than or equal to the volume of the metering chamber.

20. The limited flow cup of claim 1 wherein the outer cup and inner cup include corresponding structures that prevent the outer cup from being used without the inner cup in nested arrangement with the outer cup.

\* \* \* \* \*